US009403552B2

(12) United States Patent
Onohara (10) Patent No.: US 9,403,552 B2
(45) Date of Patent: Aug. 2, 2016

(54) STEERING WHEEL (71) Applicant: TAKATA CORPORATION, Minato-ku, Tokyo (JP)

(72) Inventor: Keisuke Onohara, Tokyo (JP)

(73) Assignee: TAKATA CORPORATION, Tokyo (JP)

( * ) Notice: Subject to any disclaimer, the term of this patent is extended or adjusted under 35 U.S.C. 154(b) by 2 days.

(21) Appl. No.: 14/417,469

(22) PCT Filed: Jul. 26, 2013

(86) PCT No.: PCT/JP2013/070350
§ 371 (c)(1),
(2) Date: Jan. 26, 2015

(87) PCT Pub. No.: WO2014/024703
PCT Pub. Date: Feb. 13, 2014

(65) Prior Publication Data
US 2015/0210308 A1    Jul. 30, 2015

(30) Foreign Application Priority Data
Aug. 6, 2012  (JP) ................................. 2012-173687

(51) Int. Cl.
*B62D 1/11*     (2006.01)
*B60R 21/203*   (2006.01)
*B60Q 5/00*     (2006.01)
*B62D 1/04*     (2006.01)

(52) U.S. Cl.
CPC *B62D 1/11* (2013.01); *B60Q 5/003* (2013.01); *B60R 21/2037* (2013.01); *B62D 1/046* (2013.01)

(58) Field of Classification Search
CPC .............. B62D 1/11; B62D 1/04; B60Q 5/00; G05G 1/10

USPC ................ 200/61.54, 61.55; 74/552; 280/731
See application file for complete search history.

(56) References Cited

U.S. PATENT DOCUMENTS

| 8,733,203 B2 | 5/2014 | Kondo et al. |
| 2001/0050473 A1* | 12/2001 | Fujita ..................... B60Q 5/003 280/731 |
| 2009/0218739 A1* | 9/2009 | Terada ................ B60R 21/2037 267/2 |

(Continued)

FOREIGN PATENT DOCUMENTS

| JP | 2001-159410 A | 6/2001 |
| JP | 2012-056460 A | 3/2012 |
| JP | 2012-056461 A | 3/2012 |

OTHER PUBLICATIONS

PCT, "International Search Report for International Application No. PCT/JP2013/070350".

*Primary Examiner* — Edwin A. Leon
*Assistant Examiner* — Iman Malakooti
(74) *Attorney, Agent, or Firm* — Manabu Kanesaka (57) ABSTRACT

An opening portion 111 includes a plurality of extended portions 111a that are each a portion of the opening portion 111 with an enlarged diameter and a notch 111b formed in an edge portion. An insulator 6 includes a support 6a that has a larger diameter than that of the opening portion 111, a trunk portion 6b that has a smaller diameter than that of the support 6a and that can be inserted through the opening portion 111, a plurality of lock portions 6c, the diameter of which is partially enlarged from the trunk portion 6b, that can be passed through the extended portions 111a, a hook portion 6d that is formed on a lateral side of the trunk portion 6b and that can be engaged with the notch 111b, and engagement holes 6e that are formed in a surface that is in contact with the stopper 5, the engagement holes 6e engaging thereto a jig 8 for fixing the insulator 6 to the opening portions 111.

5 Claims, 8 Drawing Sheets

(56) References Cited

U.S. PATENT DOCUMENTS

| | | | |
|---|---|---|---|
| 2011/0120258 A1* | 5/2011 | Kondo | B60Q 5/003 74/552 |
| 2013/0026741 A1* | 1/2013 | Onohara | B60R 21/2037 280/731 |
| 2013/0239739 A1 | 9/2013 | Miyahara et al. | |

* cited by examiner

STEERING WHEEL

RELATED APPLICATIONS

The present application is National Phase of International Application No. PCT/JP2013/070350 filed Jul. 26, 2013, and claims priority from Japanese Application No. 2012-173687, filed Aug. 6, 2012, the disclosure of which is hereby incorporated by reference herein in its entirety.

TECHNICAL FIELD

The present invention relates to a steering wheel mounted on a vehicle, such as an automobile, and particularly to a steering wheel that includes a dynamic damper serving as a vibration damping mechanism.

BACKGROUND ART

There are known steering wheels for steering a vehicle, such as an automobile, in which the steering wheels include a body portion that is mounted on a steering shaft that converts a rotating operation into a steering operation, a pad portion that is disposed in substantially the middle of the body portion, and a horn switch that is configured by mounting the pad portion on the body portion so as to be movable in the axial direction of the steering shaft, the horn switch being configured between the body portion and the pad portion (see PTL 1 and PTL 2, for example).

The steering wheel described in PTL 1 includes a first horn plate that is fixed to the body portion, a second horn plate that is fixed to the pad portion, guide pins that are erected on the second horn plate, stoppers that are formed at the distal ends of the guide pins, bushes (also referred to as insulators) that are inserted so as to be slidable along the guide pins, elastic bodies that are fitted to the bushes, the outer peripheral portion of the elastic bodies being engaged with the first horn plate, and coil springs through which the guide pins are inserted so as to bias the bushes towards the stoppers.

Furthermore, the steering wheel described in PTL 2 has a horn bracket that is fixed to the steering wheel and an inflator, and includes an air bag module that serves as a weight and spring units that are provided between the air bag module and the horn bracket and that transmit vibration of the steering wheel to the air bag module so as to constitute a dynamic damper. The spring units each include an elastic body that transmits vibration, a protector that is mounted on either one of the horn plate and the air bag module, the protector made of synthetic resin and accommodating the elastic body therein so as to allow the elastic body to elastically deform itself, and a rotation regulating mechanism that is provided between the protector and the elastic body and that regulates the rotation of the elastic body inside the protector.

CITATION LIST

Patent Literature

PTL 1: Japanese Unexamined Patent Application Publication No. 2011-110941
PTL 2: Japanese Unexamined Patent Application Publication No. 2012-56460

SUMMARY OF INVENTION

Technical Problem

Since the above-described steering wheel described in PTL 1 is configured so that each elastic body is connected to a corresponding opening portion, which is formed in the horn plate, directly or through a collar, work of mounting the damper on the horn plate takes time and labor.

Furthermore, in the steering wheel described in PTL 2 described above, insertion slots and stop slots are formed in opening portions (mounting holes) that are formed in the horn plate so that, after inserting the dampers (the shell pieces) into the mounting holes and the insertion slots, positioning pieces are locked in the stop slots by rotating the damper (the shell pieces). However, since the dampers (the shell pieces) need to be rigidly fixed to the horn plate, rotation of the damper requires a large torque; accordingly, the positioning pieces cannot be locked to the stop slots without using a jig. Hence, typically, the horn plate is flipped while maintaining a state in which the dampers (the shell pieces) are inserted in the mounting hole through the upper surface of the horn plate, a jig is bound to the distal end portion of a damper (a shell piece), and the damper (the shell piece) is rotated. Accordingly, work of mounting the dampers (the shell pieces) on the horn plate is cumbersome.

Furthermore, in the steering wheel described in PTL 2 described above, a pair of gripping pieces that bind each damper (each shell piece) to the corresponding mounting hole are formed at opposing positions and a pair of positioning pieces that position each damper (each shell piece) to the corresponding mounting hole are formed at opposing positions such that, after inserting the damper (the shell piece) into the mounting hole, the damper (the shell piece) can be fixed to the horn plate by rotating the damper (the shell piece) in a predetermined direction. However, when there are a plurality of positioning mechanisms, because of the manufacturing error of the stop slots and the damper (the shell piece) and the mounting error of the damper (the shell piece), the positioning pieces may interfere with the stop slots and the positioning pieces may not be able to be locked in the stop slots; accordingly high manufacturing precision and high mounting precision are disadvantageously required.

Furthermore, in a case in which the number of positioning mechanisms is one, while inserting the damper (the shell piece) into the mounting hole, the position of the positioning piece needs to be checked and the direction of rotation needs to be determined such that work of mounting the dampers (the shell pieces) on the horn plate is disadvantageously cumbersome.

The present invention has been conceived in view of the above problems, and an object thereof is to provide a steering wheel that can achieve simplification and labor saving of the mounting work of the dynamic damper.

Solution to Problem

According to the present invention, a steering wheel is provided that includes a body portion that is mounted on a steering shaft that converts a rotating operation into a steering operation; a pad portion that is disposed in substantially a middle of the body portion; a horn switch that is configured by mounting the pad portion on the body portion so as to be movable in the axial direction of the steering shaft, the horn switch being configured between a fixed contact that is disposed on a body portion side and a movable contact that is disposed on a pad portion side; a first horn plate that is fixed to the body portion; a second horn plate that is fixed to the pad portion; a guide pin that is inserted through an opening portion of the first horn plate and that is erected with respect to the second horn plate; a flange-shaped stopper that is formed in the guide pin; an insulator that is locked to the opening portion of the first horn plate and that is disposed so as to be slidable along the guide pin; and a coil spring that is disposed between the second horn plate and the insulator and that biases the insulator towards the stopper, in which the opening portion includes a plurality of extended portions that are each a portion of the opening portion with an enlarged diameter, and a notch formed in an edge portion, and the insulator includes a support that has a larger diameter than a diameter of the opening portion, a trunk portion that has a smaller diameter than the diameter of the support and that can be inserted through the opening portion, a plurality of lock portions having diameters which are partially enlarged from the trunk portion, the plurality of lock portions being capable of passing through the extended portions, a hook portion that is formed on a lateral side of the trunk portion and that can be engaged with the notch, and engagement holes that are formed in a surface that is in contact with the stopper, the engagement holes engaging thereto a jig for fixing the insulator to the opening portions.

In the opening portion, among the plurality of extended portions, at least at one of the extended portions may have a size or a shape that is different from those of the other extended portions. Furthermore, the notch may be formed at a single portion of the edge portion of the opening portion.

Furthermore, the insulator may include a first insulator that includes a first flange portion that forms a surface in contact with the stopper and a first leg portion that is disposed along the guide pin, a second insulator that includes a second flange portion that forms a surface in contact with the coil spring and a second leg portion that is disposed along the guide pin, a protector that is disposed between the first flange portion and the second flange portion and that includes the support and the trunk portion, and an elastic body that is disposed between the protector and the first insulator and between the protector and the second insulator.

Furthermore, the engagement holes may include first engagement holes that penetrate the first flange portion, second engagement holes that penetrate a portion of the elastic body, and third engagement holes that do not penetrate through the support.

Advantageous Effects of Invention

According to the steering wheel according to the present invention described above, the engagement holes are formed in the surface of the insulator that is in contact with the stopper and the jig is inserted into the engagement holes to rotate the insulator; accordingly, after inserting the insulator in the opening portion of the first horn plate, the jig can be attached to the insulator without flipping the first horn plate, and the insulator can be rotated easily. Accordingly, simplification and labor saving of the mounting work of the insulator, in other words, the dynamic damper, can be achieved.

Furthermore, among the plurality of extended portions that are formed in the opening portion into which the insulator is mounted, since an extended portion at least at one portion is formed so as to have a size or a shape that is different from the other extended portions, the orientation of the insulator that is inserted into the opening portion can be the same at all times, and insertion of the insulator into the opening portion can automatically determine the rotating direction and the rotation amount and, accordingly, simplification or labor saving of the mounting work of the insulator can be achieved.

Furthermore, by having the notch at one portion, no interference of the hook portion that engages with the notch occurs; accordingly, the permissible value of the manufacturing error and the mounting error of the insulator can be increased and the workload needed to fabricate and mount the insulator can be reduced.

Furthermore, by splitting the insulator into the first insulator, the second insulator, the protector, and the elastic body, a dynamic damper can be configured that carries out vibration damping by adjusting the natural frequency of the pad portion, which is a mass body, to cancel out the vibration transmitted from the body portion with resonance of the pad portion, and fabrication of the insulator with the above configuration can be facilitated.

Furthermore, by constituting the engagement holes with the first engagement holes, the second engagement holes, and the third engagement holes, the jig can be inserted therein to a sufficient depth that can give an appropriate rotational torque to the insulator. In particular, by inserting the jig through to the third engagement holes, rotational torque can be given directly to the protector that is locked to the edge portion of the open portion and, accordingly, the insulator can be rotated easily.

BRIEF DESCRIPTION OF DRAWINGS

FIG. 3 includes detail drawings of the first insulator constituting the insulator, in which

FIG. 4 includes detail drawings of a second insulator constituting the insulator, in which

FIG. 5 includes detail drawings of a protector constituting the insulator, in which

FIG. 6 includes detail drawings of an elastic body constituting the insulator, in which

FIG. 7 includes bottom views illustrating an assembling process of the insulator, in which

FIG. 8 includes cross-sectional views illustrating the assembling process of the insulator, in which

DESCRIPTION OF EMBODIMENTS

Figure 1:
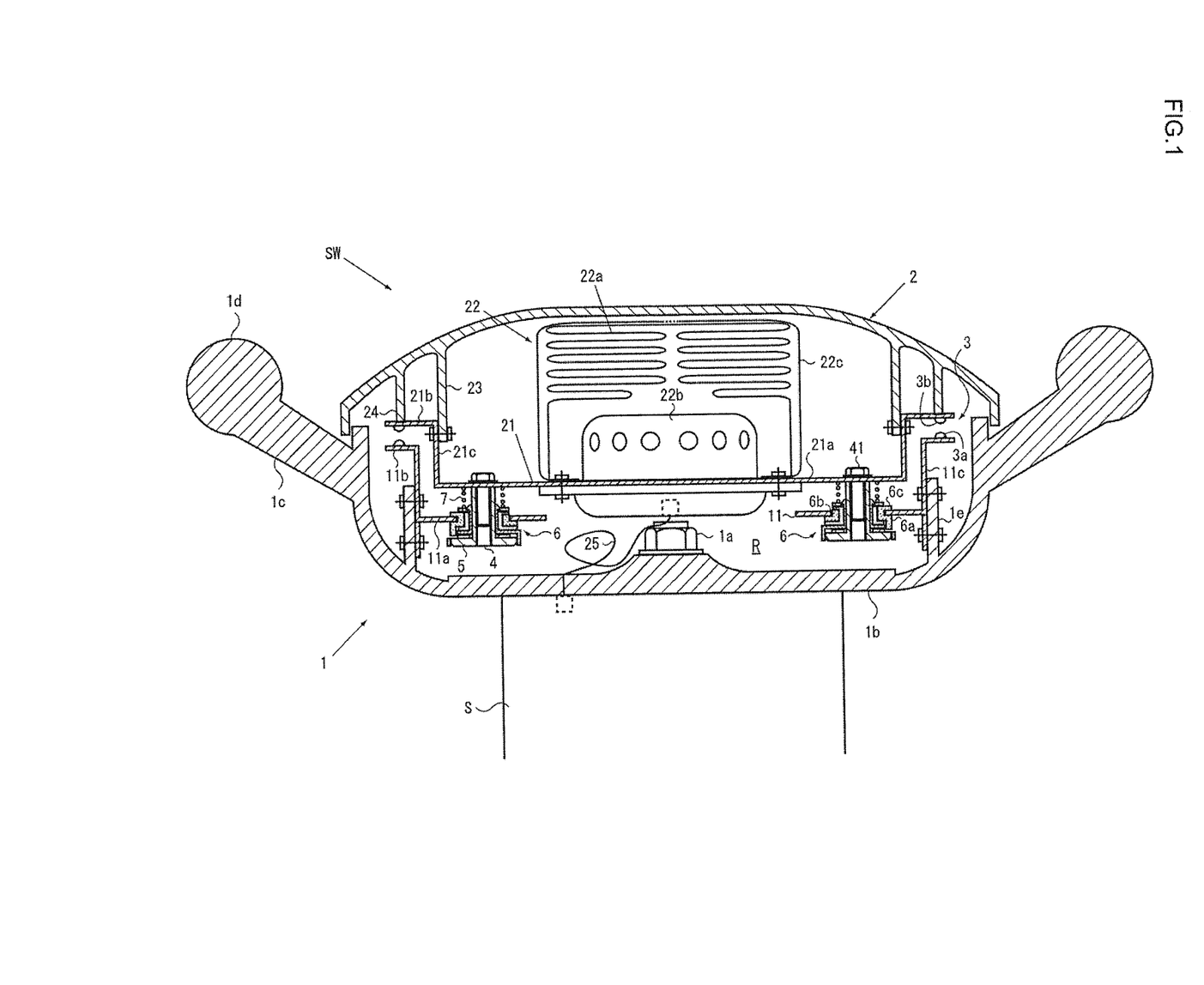
FIG. 1 is a cross-sectional view illustrating a steering wheel according to the embodiment of the present invention.
Figure 2:
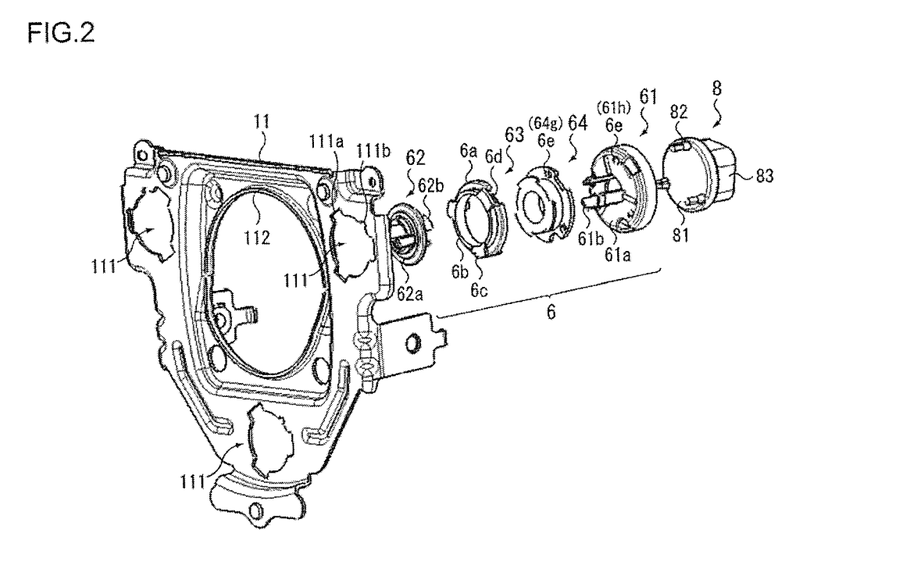
FIG. 2 is a development of the components of an insulator illustrated in FIG. 1.
Figure 3A:
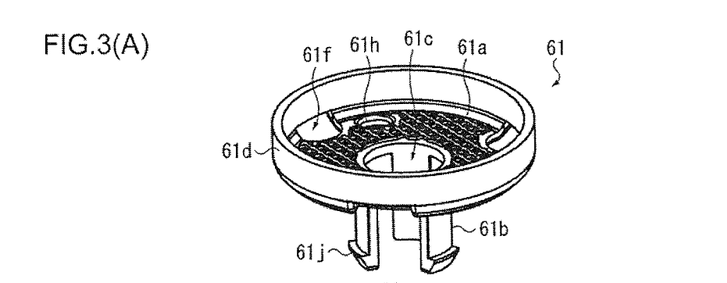
FIG. 3(A) is a perspective view.
Figure 3B:
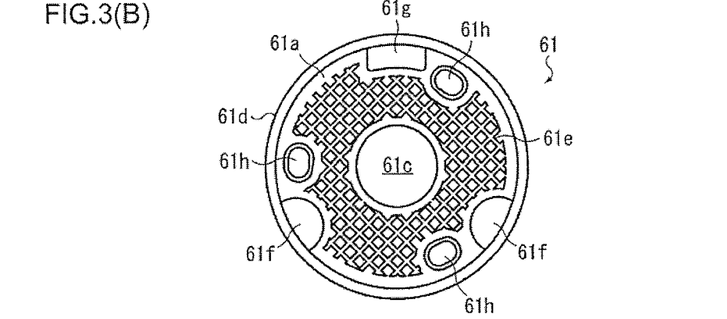
FIG. 3(B) is a plan view.
Figure 3C:
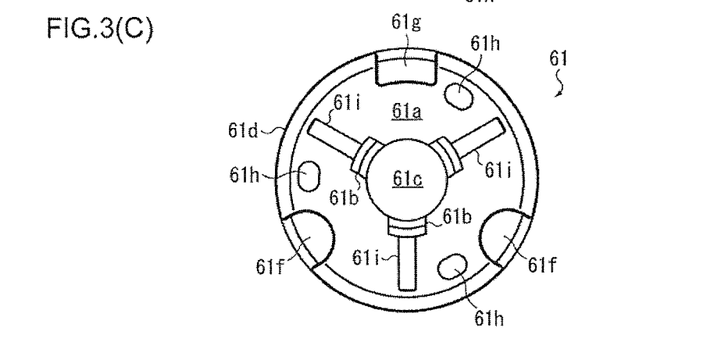
FIG. 3(C) is a rear view.
Figure 4A:
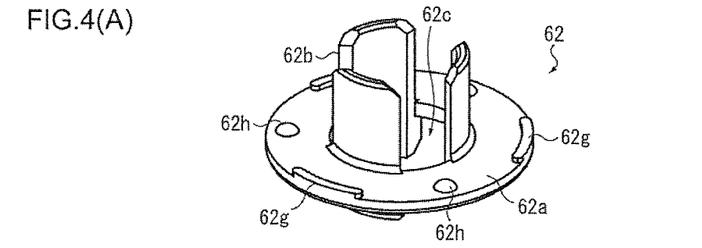
FIG. 4(A) is a perspective view.
Figure 4B:
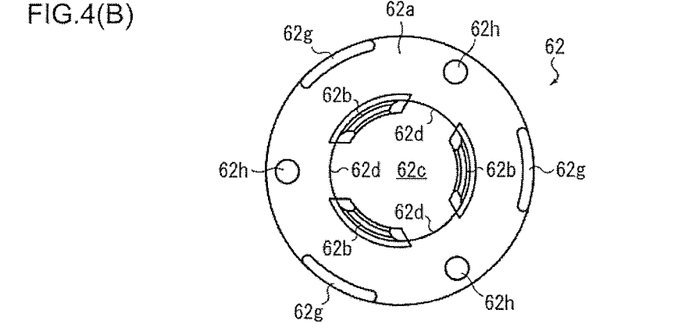
FIG. 4(B) is a plan view.
Figure 4C:
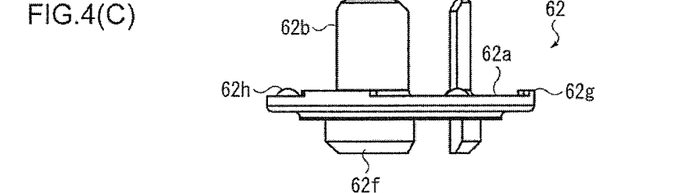
FIG. 4(C) is a side view.
Figure 4D:
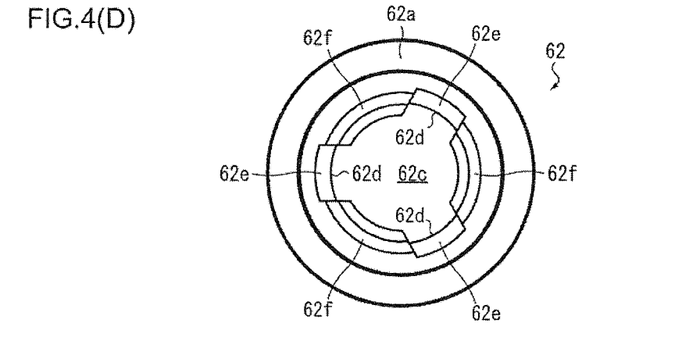
FIG. 4(D) is a rear view.

Hereinafter, an embodiment of the present invention will be described using FIGS. 1 to 8. Herein, FIG. 1 is a cross-sectional view illustrating a steering wheel according to the embodiment of the present invention. FIG. 2 is a development of the components of an insulator illustrated in FIG. 1. FIG. 3 includes detail drawings of the first insulator constituting the insulator, in which FIG. 3(A) is a perspective view, FIG. 3(B) is a plan view, and FIG. 3(C) is a rear view. FIG. 4 includes detail drawings of a second insulator constituting the insulator, in which FIG. 4(A) is a perspective view, FIG. 4(B) is a plan view, FIG. 4(C) is a side view, and FIG. 4(D) is a rear view. FIG. 5 includes detail drawings of a protector constituting the insulator, in which FIG. 5(A) is a plan view, FIG.

Figure 5A:
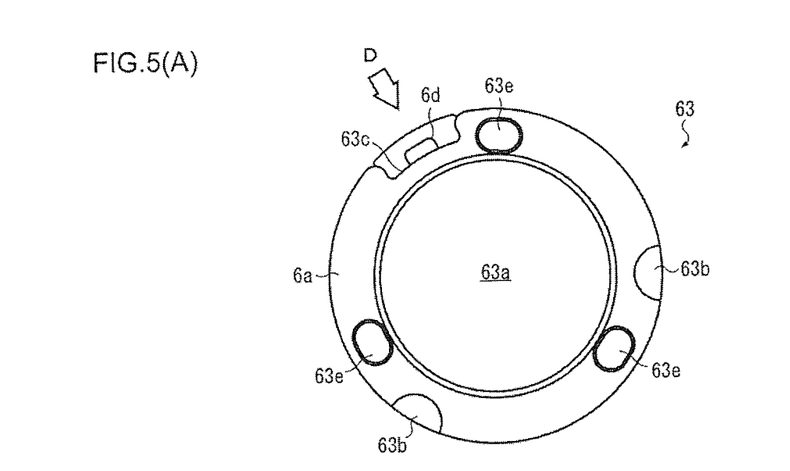
FIG. 5(A) is a plan view.
Figure 5B:
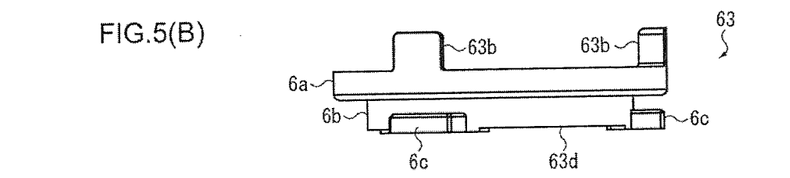
FIG. 5(B) is a side view.
Figure 5C:
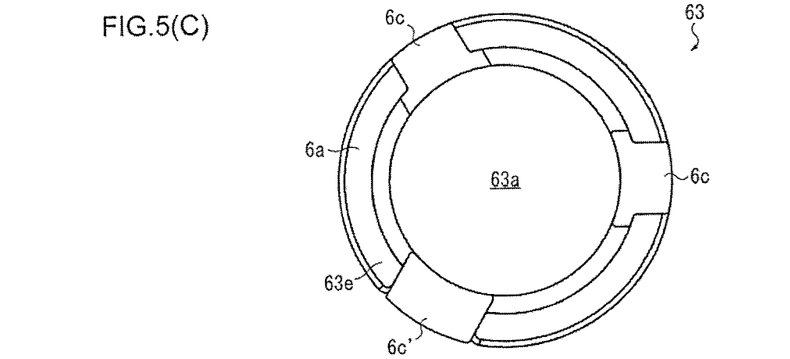
FIG. 5(C) is a rear view.
Figure 5D:
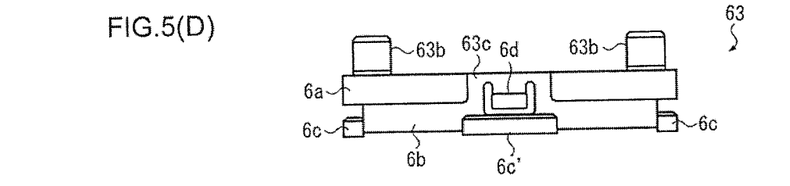
FIG. 5(D) is a view on arrow D of FIG. 5(A).
Figure 6A:
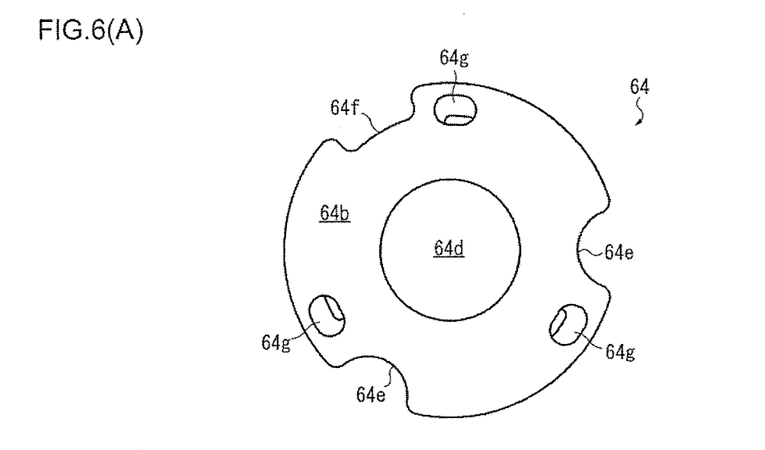
FIG. 6(A) is a plan view.
Figure 6B:
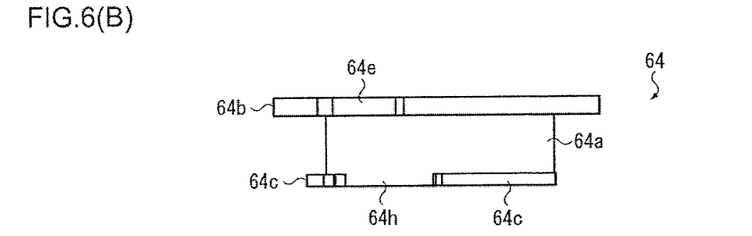
FIG. 6(B) is a side view.
Figure 6C:
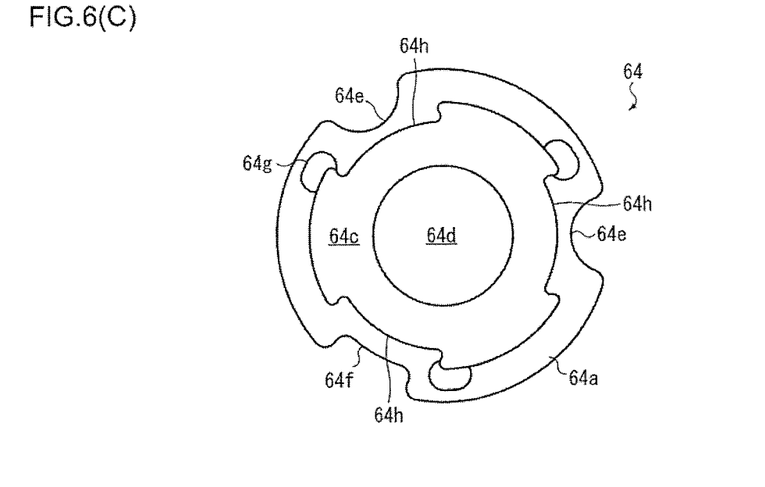
FIG. 6(C) is a rear view.

5(B) is a side view, FIG. 5(C) is a rear view, and FIG. 5(D) is a view on arrow D of FIG. 5(A). FIG. 6 includes detail drawings of an elastic body constituting the insulator, in which FIG. 6(A) is a plan view, FIG. 6(B) is a side view, and FIG. 6(C) is a rear view.

As illustrated in FIGS. 1 to 6, a steering wheel SW according to the embodiment of the present invention includes a body portion 1 that is mounted on a steering shaft S that converts a rotating operation into a steering operation, a pad portion 2 that is disposed in substantially the middle of the body portion 1, and a horn switch 3 that is configured by mounting the pad portion 2 on the body portion 1 so as to be movable in the axial direction of the steering shaft S, the horn switch 3 being configured between fixed contacts 3a that are arranged on the body portion 1 side and movable contacts 3b that are arranged on the pad portion 2 side. The steering wheel SW includes a first horn plate 11 that is fixed to the body portion 1, a second horn plate 21 that is fixed to the pad portion 2, guide pins 4 that are inserted through opening portions 111 of the first horn plate 11 and that are erected on the second horn plate 21, flange-shaped stoppers 5 that are formed in the guide pins 4, insulators 6 that are locked to the opening portions 111 of the first horn plate 11 and that are disposed so as to be slidable along the guide pins 4, and coil springs 7 that are disposed between the second horn plate 21 and the insulators 6 and that bias the insulators 6 towards the stoppers 5. The opening portions 111 each include a plurality of extended portions 111a that are each a portion of the opening portion 111 with an enlarged diameter and a notch 111b formed in an edge portion of the opening portions 111. The insulators 6 each include a support 6a that has a larger diameter than that of the opening portion 111, a trunk portion 6b that has a smaller diameter than that of the support 6a and that can be inserted into the opening portion, a plurality of lock portions 6c having diameters which are partially enlarged from the trunk portion 6b, the plurality of lock portions being capable of passing through the extended portions 111a, a hook portion 6d that is formed on the lateral side of the trunk portion 6b and that can be engaged with the notch 111b, and engagement holes 6e that are formed in a surface that is in contact with the stopper 5, the engagement holes 6e engaging thereto a jig 8 for fixing the insulator 6 to the opening portions 111.

As illustrated in FIG. 1, the body portion 1 includes a boss portion 1b that is fixed to the steering shaft S with a fixture 1a, a plurality of spoke portions 1c each extending in a radial direction from the boss portion 1b, and an annular rim portion 1d that is connected to the spoke portions 1c. Furthermore, a wall portion 1e to which the first horn plate 11 is fixed is formed inside the body portion 1. Such configuration of the body portion 1 is basically similar to conventional configurations and is not limited to the illustrated configuration.

As illustrated in FIG. 1, the pad portion 2 is disposed in the substantially middle portion of the steering wheel SW and is a component that accommodates an air bag module 22. The air bag module 22 includes an air bag 22a that is inflated and deployed in times of emergency and an inflator 22b that feeds gas to the air bag 22a. The pad portion 2 is typically formed by resin molding and is configured so that a thin wall portion formed on the backside thereof can be ruptured when the air bag 22a is inflated and deployed. Furthermore, the pad portion 2 includes a wall portion 23 to which the second horn plate 21 is fixed and a support 24 that abuts against the second horn plate 21.

Furthermore, the inflator 22b is fixed to a substantially middle portion of the second horn plate 21 fixed to the pad portion 2. The air bag 22a is fixed to the second horn plate 21 together with the inflator 22b and is accommodated inside the pad portion 2 in a folded state. The air bag 22a may be wrapped by a wrapping sheet 22c. Note that the second horn plate 21 does not have to be a discrete component and can be included in a retainer that holds the inflator 22b.

Furthermore, the pad portion 2 includes a harness 25 that is connected to the steering shaft S side and that transmits an ignition signal to the inflator 22b. Due to the attaching structure of the pad portion 2 attached to the body portion 1, the harness 25 has a length of about 100 to 200 mm, for example, and is received inside a space R formed between the pad portion 2 and the body portion 1 after the pad portion 2 is attached to the body portion 1.

As illustrated in FIG. 1, the first horn plate 11 includes a first flat surface portion 11a through which the guide pins 4 are inserted, a second flat surface portion 11b on which the fixed contacts 3a of the horn switch 3 are disposed, and a step portion 11c that connects the first flat surface portion 11a and the second flat surface portion 11b to each other. The first horn plate 11 is fixed to the wall portion 1e of the body portion 1 with a fixture such as a rivet. Note that the first flat surface portion 11a and the second flat surface portion 11b may be formed of an integral plate or may be formed of separate plates. In other words, the fixed contacts 3a may be formed on the first horn plate 11 or may be connected to the body portion 1 as separate members.

As illustrated in FIG. 1, the second horn plate 21 includes a first flat surface portion 21a to which the inflator 22b is fixed and on which the guide pins 4 are erected, a second flat surface portion 21b on which the movable contacts 3b of the horn switch 3 are arranged, and a lateral side portion 21c that connects the first flat surface portion 21a and the second flat surface portion 21b to each other. The lateral side portion 21c is fixed to the wall portion 23 of the pad portion 2 with a fixture such as a rivet. Note that the first flat surface portion 21a and the second flat surface portion 21b may be formed of an integral plate or may be formed of separate plates. In other words, the movable contacts 3b may be formed on the second horn plate 21 or may be connected to the pad portion 2 as separate members.

The body portion 1 and the pad portion 2 that are described above are configured so as to allow relative movement with respect to each other in the axial direction of the steering shaft S and so as to be capable of being insulated to each other with a horn switch support mechanism, which is constituted by the guide pins 4, the stoppers 5, the insulators 6, and the coil springs 7, forming a so-called dynamic damper. Furthermore, with the relative movement between the body portion 1 and the pad portion 2, the fixed contacts 3a and the movable contacts 3b come into contact with each other, and, accordingly, the horn switch 3 sounds the horn.

As illustrated in FIG. 1, the guide pins 4 are each formed integrally with the corresponding stopper 5 into a nut shape. The guide pins 4 and securing members 41, such as bolts, are screwed together having the second horn plate 21 in between; accordingly, the guide pins 4 are fixed to the second horn plate 21. The stoppers 5 are each formed, for example, in the vicinity of the distal end of the corresponding guide pin 4 in an integral manner and includes the flange portion that is formed with a larger diameter than that of the guide pin 4. However, each guide pin 4 and the corresponding stopper 5 do not have to be an integral component but may be separate components. Such stoppers 5 determine the position of the insulators 6 when the horn switch 3 is in a normal state (a state other than when the horn is sounded) and restrict the insulators 6 from falling off. Note that washers and the like may be interposed between the stoppers 5 and the insulators 6.

The insulators 6 are components that slide along the guide pins 4. Specifically, as illustrated in FIG. 2, the insulator 6 includes a first insulator 61 that includes a first flange portion 61a that forms a surface in contact with the stopper 5 and first leg portions 61b that are disposed along the guide pin 4, a second insulator 62 that includes a second flange portion 62a that forms a surface in contact with the coil spring 7 and second leg portions 62b that are disposed along the guide pin 4, a protector 63 that is disposed between the first flange portion 61a and the second flange portion 62a and that includes the support 6a and the trunk portion 6b, and an elastic body 64 that is disposed between the protector 63 and the first insulator 61 and between the protector 63 and the second insulator 62. Note that for convenience of description, FIG. 2 only illustrates an insulator 6 that is mounted in an opening portion 111 at one portion among the plurality of opening portions 111, and the drawings of the other insulators 6 are omitted.

As illustrated in FIGS. 3(A) to 3(C), the first insulator 61 includes the first flange portion 61a and the first leg portions 61b, and an opening portion 61c through which the guide pin 4 is inserted is formed in the middle portion of the first insulator 61. Furthermore, a wall portion 61d that covers an outer peripheral portion of the stopper 5 is formed in a peripheral edge portion of each first flange portion 61a. By forming such a wall portion 61d, the harness 25 that is received in the space R can be prevented from being bitten.

Furthermore, a plurality of concavities and convexities 61e are formed in a surface of the first flange portion 61a on the stopper 5 side (in other words, the surface in contact with the stopper 5). Note that although the concavities and convexities 61e herein are formed by lattice-shaped projections, the concavities and convexities 61e are not limited to the lattice-shaped projections and may be, for example, circular projections, recesses, or the like. By forming such concavities and convexities 61e, sticking of the first flange portion 61a can be suppressed and, accordingly, generation of abnormal noise and damage to the insulator 6 can be suppressed.

Furthermore, the first flange portion 61a includes, in its peripheral edge portion, insertion holes 61f through which pillar-shaped projections 63b (see FIG. 5) of the protector 63 can be inserted. By forming such insertion holes 61f, the protector 63 and the first insulator 61 can be locked in the circumferential direction such that rotation can be suppressed when the first insulator 61 (in other words, the insulator 6) is in use and, accordingly, wear of the insulator 6 can be suppressed.

Furthermore, the first flange portion 61a includes, in its peripheral edge portion, a through hole 61g that allows the hook portion 6d (see FIG. 5) of the protector 63 that is locked to the first horn plate 11 to be visually observed from above. By forming such a through hole 61g, the mounted state of the horn switch supporting structure (the dynamic damper) can be checked easily.

Furthermore, the first insulator 61 includes first engagement holes 61h that penetrate the first flange portion 61a. Such first engagement holes 61h are through holes for inserting portions of the jig 8 that rotate the insulator 6 when the insulator 6 is attached. The first engagement holes 61h are, for example, formed at three portions at equal intervals; however, the arrangement of the first engagement holes 61h is not limited to this arrangement as long as at least two or more engagement holes are arranged in accordance with the configuration of the jig 8.

Furthermore, a plurality of linear projections 61i are formed on the back surface of the first flange portion 61a. The linear projections 61i are, for example, formed radially; however, the arrangement of the linear projections 61i is not limited to the illustrated arrangement and a short linear projection may be added to another portion of the back surface of the first flange portion 61a or one or some of the linear projections 61i may not be arranged radially. By appropriately adjusting the number, the length, the width, the height, and the like of the linear projections 61i, the linear projections 61i is configured so as to be capable of being jammed into the elastic body 64 to generate a desired frictional force. By adjusting such frictional force, the amplitude or the frequency that occurs due to vibration of the pad portion 2 can be adjusted in an optional manner.

Each first leg portions 61b is provided so as to stand on a portion of the peripheral edge portion of the opening portion 61c and includes, at its tip portion, a hook portion 61j that can be locked to the corresponding second insulator 62. Herein, three first leg portions 61b are illustrated; however, there may be two first leg portions 61b or four or more first leg portions 61b. Furthermore, the first leg portions 61b being combined with second leg portions 62b of the second insulator 62 described later forms a substantially cylindrical portion that is arranged along the guide pin 4.

As illustrated in FIGS. 4(A) to 4(D), the second insulator 62 includes the second flange portion 62a and the second leg portions 62b, and an opening portion 62c through which the guide pin 4 is inserted is formed in the middle portion of the second insulator 62. Furthermore, since the second flange portion 62a is a portion that is inserted through the opening portion 111 of the first horn plate 11, the diameter of the second flange portion 62a is formed smaller than the diameters of the first flange portion 61a and the opening portion 111.

Furthermore, receiving portions 62d through which the first leg portions 61b of the first insulator 61 can be inserted are formed in the peripheral edge portion of the opening portion 62c of the second flange portion 62a. By inserting the first leg portions 61b of the first insulator 61 through the receiving portions 62d and attaching the first insulator 61 to the second insulator 62, a substantially cylindrical portion that is capable of sliding along the guide pin 4 can be formed. Furthermore, recesses 62e that can lock the hook portions 61j of the first leg portions 61b thereto may be formed in the edge portion of the receiving portions 62d. As described above, by disposing the lock portions of the hook portions 61j at recessed positions with respect to the surface of the second flange portion 62a, the coil spring 7 can be prevented from coming in contact with the lock portion of the hook portion 61j.

Furthermore, a spring guide 62f that stands along the peripheral edge portion of the opening portion 62c is formed on the surface of the second flange portion 62a on the coil spring 7 side. The coil spring 7 is inserted over the outer periphery of the spring guide 62f. The spring guide 62f has, for example, an outside diameter that coincides with or is slightly larger than the inside diameter of the coil spring 7, and the coil spring 7 is locked by being pushed into the spring guide 62f.

Furthermore, the second leg portions 62b are formed along the opening portion 62c of the second flange portion 62a. Since the second leg portions 62b are portions that constitute the cylindrical shape by filling into the gaps between the first leg portions 61b, the second leg portions 62b are appropriately changed according to the shape and arrangement of the first leg portions 61b. By forming the cylindrical shape with the first leg portions 61b and the second leg portions 62b, the cylindrical portion that slides along the guide pin 4 can be configured.

Furthermore, stopper walls 62g that can be abutted against the surface of the protector 63 may be formed on the peripheral edge portion of the surface of the second flange portion 62a on the elastic body 64 side. Such stopper walls 62g functions to secure a predetermined space between the second flange portion 62a and the protector 63 by abutting against the surface of the protector 63 so that no more than a predetermined load is loaded on the elastic body 64 when the elastic body 64 is pressed between the second flange portion 62a and the protector 63.

Furthermore, a plurality of point-like protrusions 62h are formed on the surface of the second flange portion 62a that is in contact with the elastic body 64. By forming such point-like protrusions 62h, a frictional force can be generated between the insulator 6 of the second flange portion 62a and the elastic body 64 so as to assist the frictional force generated in the first flange portion 61a. Although the point-like protrusions 62h are arranged at three portions herein, the point-like protrusions 62h are not limited to the illustrated arrangement and shape, and the positions of arrangement, the number, the size of the diameter, and the like may be set in an optional manner.

The protector 63 is a protective component that prevents the elastic body 64 from directly coming in contact with the first horn plate 11. Specifically, the protector 63 is externally fitted to the elastic body 64 and is sandwiched between the first flange portion 61a and the second flange portion 62a. By disposing such a protector 63, scraping between the elastic body 64 and the first horn plate 11 is eliminated when the dynamic damper is vibrating or is sounding the horn; accordingly, wear of the elastic body 64 can be suppressed.

Furthermore, each protector 63 has, as a whole, a thin and flat substantially cylindrical shape and includes the support 6a that has a larger diameter than that of the opening portion 111 of the first horn plate 11, the trunk portion 6b that has a smaller diameter than that of the support 6a and that can be inserted through the opening portion 111, the plurality of lock portions 6c, the diameter of which is partially enlarged from the trunk portion 6b, that can be passed through the extended portions 111a of the opening portion 111, the hook portion 6d that is formed on the lateral side of the trunk portion 6b and that can be engaged with the notch 111b of the opening portion 111. Furthermore, an opening portion 63a through which the guide pin 4 is inserted is formed in the middle portion of the protector 63.

Furthermore, the protector 63 includes the pillar-shaped projections 63b that stand on the peripheral edge portion of the support 6a. The pillar-shaped projections 63b are configured so as to be capable of being inserted through the insertion holes 61f formed in the first flange portion 61a of the insulator 6. Furthermore, the pillar-shaped projections 63b may be arranged so as to be capable of being abutted against the stopper 5 so that even when the elastic body 64 is compressed between the stopper 5 and the first horn plate 11, the pillar-shaped projections 63b abutting against the stopper 5 prevents the elastic body 64 from being loaded excessive load.

Furthermore, the trunk portion 6b includes the hook portion 6d that can be locked to the first horn plate 11, and the support 6a includes a notch 63c allowing the hook portion 6d that has been locked to the first horn plate 11 to be visually observed from above. The hook portion 6d is formed between the support 6a and the lock portion 6c and is configured so as to be capable of being displaced in the radial direction with elastic force. The number of hook portions 6d formed needs to be the same as the number of notches 111b formed in the opening portion 111 and needs to be formed at least at one portion. However, if there are a plurality of hook portions 6d, the plurality of hook portions 6d and the notches 111b may positionally interfere with each other; accordingly, it is preferable that the hook portion 6d be formed at a single portion.

Furthermore, although the lock portions 6c are, for example, arranged at three portions at equal intervals on the outer periphery of the trunk portion 6b, the arrangement is not limited to this arrangement. Among the lock portions 6c at the three portions, the lock portion 6c' that is formed at a position corresponding to the hook portion 6d is formed wider than the other lock portions 6c. As described above, among the plurality of lock portions 6c, by forming at least one lock portion 6c' such that a size or a shape is different from the other lock portions 6c, positioning can be facilitated when inserting the insulator 6 into the opening portion 111 and suppression in variation in the orientation of the insertion can be achieved; accordingly, simplification and labor saving of the insulator 6 assembling work can be achieved.

Furthermore, step portions 63d may be formed at the lower end portion of the trunk portion 6b and between the lock portions 6c. By forming such step portions 63d, portions other than the step portions 63d can be abutted against the stopper wall 62g that is formed on the second flange portion 62a of the second insulator 62 such that spaces that reduce the load loaded on the elastic body 64 can be formed.

Furthermore, the protector 63 includes third engagement holes 63e that do not allow the support 6a to penetrate therethrough. Such third engagement holes 63e are recesses for inserting portions of the jig 8 to rotate the insulator 6 when the insulator 6 is attached. While the third engagement holes 63e are, for example, formed at three portions at equal intervals, the arrangement is not limited to the above as long as two or more third engagement holes 63e are arranged in accordance with the configuration of the jig 8. Note that the third engagement holes 63e need to be formed at positions that coincide with the first engagement holes 61h that are formed in the first flange portion 61a of the first insulator 61.

As illustrated in FIG. 2, the elastic body 64 is a molded rubber component that is fitted between the first flange portion 61a and the second flange portion 62a of the insulator 6 that are included in the first insulator 61 and the second insulator 62, respectively. As illustrated in FIGS. 6(A) to 6(C), the elastic body 64 has a thin and flat substantially cylindrical shape and includes a substantially cylindrical trunk portion 64a, a first expanded diameter portion 64b that is formed in an end portion of the trunk portion 64a on the first flange portion 61a side, and a second expanded diameter portion 64c that is formed in an end portion of the trunk portion 64a on the second flange portion 62a side. Furthermore, an opening portion 64d through which the first leg portions 61b and the second leg portions 62b of the insulator 6 can be inserted is formed in the middle portion of the elastic body 64.

Furthermore, the first expanded diameter portion 64b includes, in the peripheral edge portion thereof, recesses 64e that can be locked with the pillar-shaped projections 63b of the protector 63. By forming such recesses 64e, the protector 63 and the elastic body 64 can be locked in the circumferential direction such that rotation when the elastic body 64 is in use can be suppressed and, accordingly, wear of the elastic body 64 can be suppressed.

Furthermore, the first expanded diameter portion 64b includes, in its peripheral edge portion, a notch 64f that allows the hook portion 6d of the protector 63 that is locked to the first horn plate 11 to be visually observed from above. The notch 64f is, for example, formed at a position that coincides with the notch 63c of the protector 63. By forming such a notch 64*f*, the mounted state of the horn switch supporting structure (the dynamic damper) can be checked easily.

Furthermore, the elastic body 64 includes second engagement holes 64*g* that penetrate the first expanded diameter portion 64*b* (in other words, portions of the elastic body 64). Such second engagement holes 64*g* are through holes for inserting portions of the jig 8 that rotate the insulator 6 when the insulator 6 is attached. While the second engagement holes 64*g* are, for example, formed at three portions at equal intervals, the arrangement is not limited to the above as long as two or more second engagement holes 64*g* are arranged in accordance with the configuration of the jig 8. Note that the second engagement holes 64*g* are formed at positions that coincide with the first engagement holes 61*h* and the third engagement holes 63*e*. In other words, the engagement holes 6*e* into which the jig 8 can be inserted include the first engagement holes 61*h* that penetrate the first flange portion 61*a* and the second engagement holes 64*g* that penetrate portions of the elastic body 64, and the third engagement holes 63*e* that do not penetrate through the support 6*a*.

Furthermore, the second expanded diameter portion 64*c* includes recesses 64*h* that are formed in the peripheral edge portions of the second expanded diameter portion 64*c* that correspond to the recesses 64*e* and the notch 64*f* of the first expanded diameter portion 64*b*. The stopper walls 62*g* that are formed on the second flange portion 62*a* are disposed in the above recesses 64*h* allowing the stopper walls 62*g* and the protector 63 to abut against each other.

As described above, by splitting the insulator 6 into the first insulator 61, the second insulator 62, the protector 63, and the elastic body 64, a dynamic damper can be configured that carries out vibration damping by adjusting the natural frequency of the pad portion 2, which is a mass body, to cancel out the vibration transmitted from the body portion 1 with resonance of the pad portion 2 and fabrication of the insulator 6 can be facilitated. Note that the insulator 6 may be an integrally molded component including the first flange portion 61*a* and the second flange portion 62*a* or may be, as illustrated in the drawings, assemblies in which a plurality of components are assembled to form the insulator 6.

As illustrated in FIG. 1, the coil spring 7 is inserted between the insulator 6 and the second horn plate 21 and abuts against the second flange portion 62*a* of the insulator 6 so as to bias the insulator 6 in a direction urging the insulator 6 towards the stopper 5. As described above, since the elastic body 64 is fitted over the outer periphery of the insulator 6 and the protector 63 is fitted over the outer periphery of the elastic body 64, the elastic body 64 is not squashed by the pressing force of the coil spring 7; accordingly, the load applied to the elastic body 64 can be reduced and the life of the elastic body 64 can be increased.

The jig 8 is a tool that rotates the insulator 6 that is inserted in the opening portion 111 of the first horn plate 11. As illustrated in FIG. 2, the first horn plate 11 includes an opening portion 112 for the inflator, the opening portion 112 being formed in a substantially middle portion of the first horn plate 11 and having the inflator 22*b* inserted therethrough, and the opening portions 111 that are arranged at the outer periphery of the opening portion 112 for the inflator, the opening portions 111 locking the insulators 6. As illustrated in the figure, although the opening portions 111 are, for example, arranged at three portions, the number of the opening portions 111 is not limited to the above number.

Figure 7A:
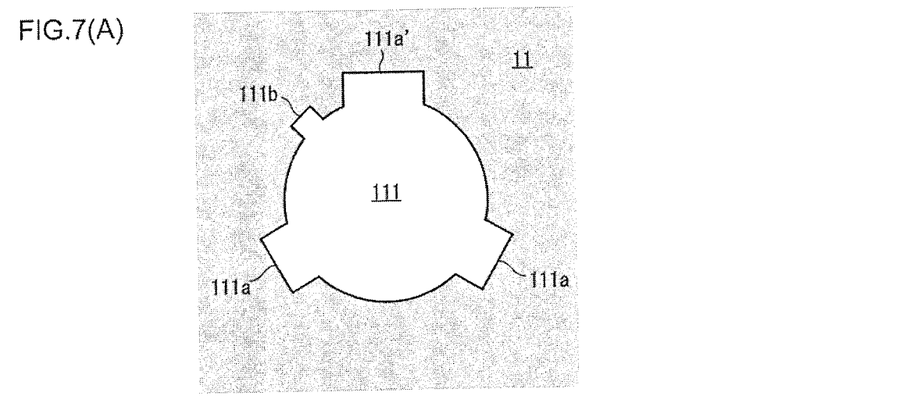
FIG. 7(A) illustrates a state before insertion.
Figure 7B:
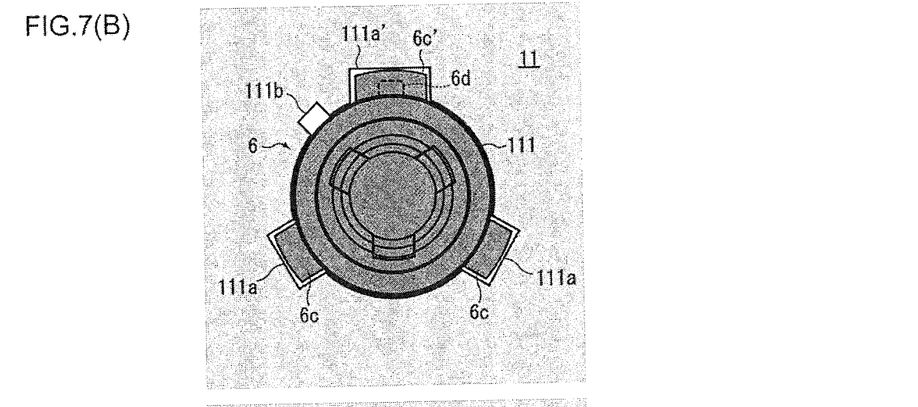
FIG. 7(B) illustrates a state after the insertion.
Figure 7C:
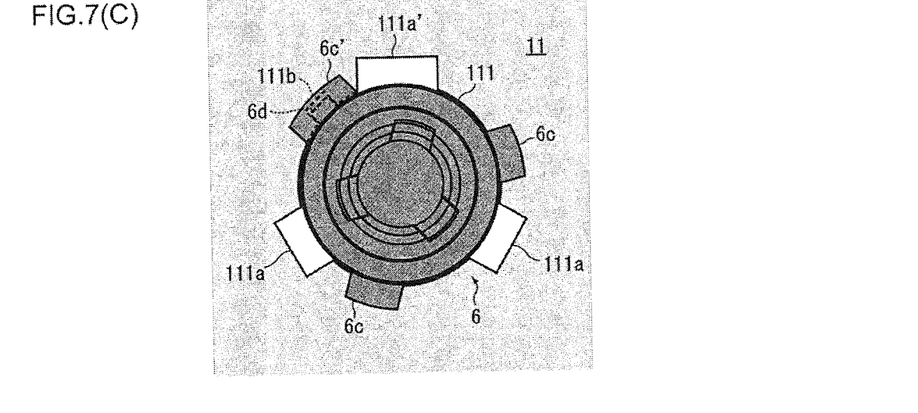
FIG. 7(C) illustrates a state after rotation.

Herein, FIG. 7 includes bottom views illustrating an assembling process of the insulator, in which FIG. 7(A) illustrates a state before insertion, FIG. 7(B) illustrates a state after the insertion, and FIG. 7(C) illustrates a state after rotation.

Figure 8A:
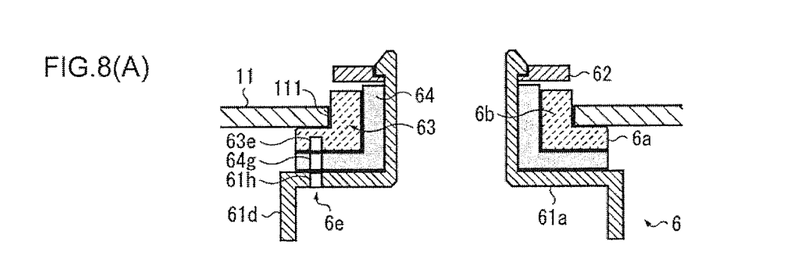
FIG. 8(A) illustrates a state before the rotation.
Figure 8B:
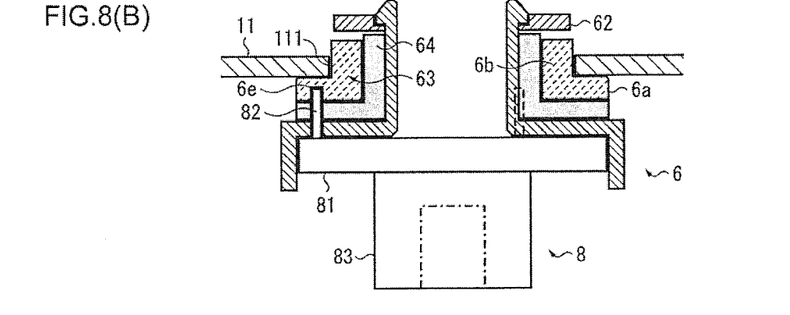
FIG. 8(B) illustrates a state in which the jig is attached.
Figures 8C, 8D:
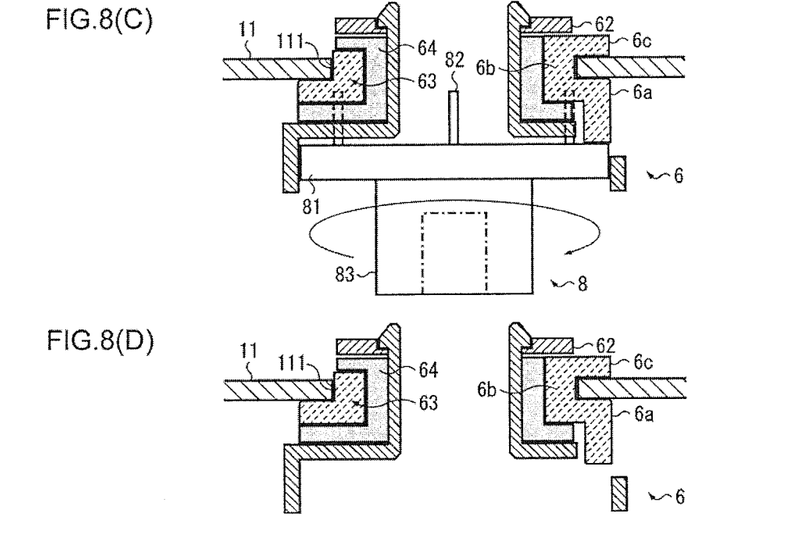
FIG. 8(C) illustrates a state after the rotation.
FIG. 8(D) illustrates a state in which the jig has been removed.

FIG. 8 includes cross-sectional views illustrating the assembling process of the insulator, in which FIG. 8(A) illustrates a state before the rotation, FIG. 8(B) illustrates a state in which the jig is attached, FIG. 8(C) illustrates a state after the rotation, and FIG. 8(D) illustrates a state in which the jig has been removed. Note that each of the drawings in FIG. 7 illustrates the underside of the first horn plate 11.

As illustrated in FIG. 7(A), the opening portion 111 includes the plurality of extended portions 111*a*, the diameter of which has been partially enlarged, and a notch 111*b* formed in the edge portion. The extended portions 111*a* are, for example, formed at three portions at equal intervals in the edge portion of the opening portion 111. Herein, among the extended portions 111*a* at three portions, an extended portion 111*a*' at one portion is formed wider than the other extended portions 111*a*. In other words, in the opening portion 111, among the plurality of extended portions 111*a*, an extended portion 111*a*' at least at one portion has a size or a shape that is different from the other extended portions 111*a*.

As described above, among the plurality of lock portions 6*c* formed in the insulator 6 (the protector 63), the lock portion 6*c*' that is formed at a position corresponding to the hook portion 6*d* is formed wider than the other lock portions 6*c*. Accordingly, the insulator 6 cannot be inserted into the opening portion 111 unless the wide lock portion 6*c*' is coincided with the wide extended portion 111*a*'.

Furthermore, the notch 111*b* is formed at one portion of the edge portion of the opening portion 111. With such a configuration, since no interference of the hook portion 6*d* engaged with the notch 111*b* will occur as was the case in which the plurality of hook portions 6*d* had been formed, the permissible value of the manufacturing error and the permissible value of the mounting error of the insulator 6 can be increased and the workload that is needed to fabricate and mount the insulator 6 can be reduced. However, such a configuration does not exclude the plurality of hook portions 6*d* from being formed.

After forming the insulator 6 by assembling the first insulator 61, the second insulator 62, the protector 63, and the elastic body 64, the insulator 6 is mounted in the opening portion 111. First, as illustrated in FIG. 7(B), when the wide lock portion 6*c*' of the insulator 6 is matched with the wide extended portion 111*a*', the other lock portions 6*c* become disposed at positions that match the other extended portions 111*a*. Subsequently, when the lock portions 6*c*' and 6*c* are passed through the extended portions 111*a*' and 111*a*, respectively, as illustrated in FIG. 8(A), the support 6*a* of the insulator 6 abuts against the first horn plate 11 and the insertion of the insulator 6 into the opening portion 111 is completed.

As described above, by forming the extended portion 111*a*' that has a shape or a size that are different from those of the other extended portions 111*a* and by forming the corresponding lock portion 6*c*' that has a shape or a size that are different from those of the other lock portions 6*c*, the orientation in which the insulator 6 is inserted into the opening portion 111 can be the same at all times. Accordingly, by having the hook portion 6*d* be formed at a position that corresponds to the notch 111*b* of the opening portion 111, once the insulator 6 is inserted into the opening portion 111, it is possible to automatically determine the rotation direction and the rotation amount; accordingly, simplification and labor saving of the insulator 6 assembling work can be achieved. Furthermore, by having the orientation of the insulator 6 that is inserted into the opening portion 111 to be the same at all times, even if there is an assembly error in the insulator 6, it will be possible to suppress the variation in the mounting error when the insulator 6 is mounted.

Subsequently, as illustrated in FIG. 8(B), portions of the jig 8 are inserted into the engagement holes 6e of the insulator 6. The jig 8, for example, includes a circular flange portion 81 that can be inserted in a recess constituted by the first flange portion 61a and the wall portion 61d of the first insulator 61, a plurality of pins 82 erected on the front side of the flange portion 81, and a connection portion 83 formed on the rear side of the flange portion 81. The pins 82 are arranged at positions that correspond to the engagement holes 6e that are formed in the insulator 6. The connection portion 83 is configured so as to be capable of being fixed to a tool, such as a wrench or an electric torque wrench, that gives rotational torque to the jig 8. The jig 8 may be connected to the insulator 6 while fixed to the tool or the jig 8 may be fixed to the tool after being connected to the insulator 6. The connection of the jig 8 to the insulator 6 is completed by inserting the pins 82 into the engagement holes 6e.

Furthermore, the engagement holes 6e include the first engagement holes 61h, the second engagement holes 64g, and the third engagement holes 63e and allow the pins 82 of the jig 8 to be inserted therein to a sufficient depth to give an appropriate rotational torque to the insulator 6. In particular, by inserting the pins 82 of the jig 8 through to the third engagement holes 63e formed in the protector 63, rotational torque can be given directly to the protector 63 that is locked to the edge portion of the open portion 111 and, accordingly, the insulator 6 can be rotated easily.

Subsequently, as illustrated in FIG. 8(C), the insulator 6 is rotated by applying rotational torque to the jig 8. At this time, regarding the insulator 6, the hook portion 6d of the insulator 6 that is illustrated in FIG. 7(B) is rotated in a direction (anticlockwise in the drawing) that engages the hook portion 6d with the notch 111b of the opening portion 111. Subsequently, as illustrated in FIG. 7(C), the rotation of the insulator 6 is stopped while the hook portion 6d of the insulator 6 is engaged with the notch 111b of the opening portion 111. At this time, since the lock portions 6c and 6c' of the insulator 6 rotate along the surface of the first horn plate 11 upon rotation of the insulator 6, as illustrated in FIG. 8(C), the edge portion of the opening portion 111 is inserted between the lock portions 6c and 6c' of the insulator 6 and the support 6a; accordingly, the insulator 6 is fixed to the opening portion 111.

Furthermore, since the hook portion 6d of the insulator 6 is engaged with the notch 111b of the opening portion 111, rotation of the insulator 6 can be suppressed while in use and the insulator 6 can be suppressed from becoming worn and from falling off. Note that checking whether the hook portion 6d has engaged with the notch 111b can be done easily by visual inspection through the through hole 61g formed in the first insulator 61, the notch 64f formed in the elastic body 64, and the notch 63c formed in the protector 63.

After the above, as illustrated in FIG. 8(D), by detaching the jig 8 from the insulator 6, mounting of the insulator 6 into the opening portion 111 is completed. As described above, since the engagement holes 6e are formed on the surface (the surface of the first flange portion 61a) that is in contact with the stopper 5 of the insulator 6 and the insulator is rotated after the jig 8 is inserted into the engagement holes 6e, after inserting the insulator 6 into the opening portion 111 of the first horn plate 11, the pins 82 of the jig 8 can be inserted into the engagement holes 6e in the same direction as the direction in which the insulator 6 has been inserted; accordingly, the jig 8 can be attached to the insulator 6 without flipping the first horn plate 11. Accordingly, simplification and labor saving of the assembly work of the insulator 6 can be achieved.

Finally, the mounting work of the dynamic damper is completed by inserting the guide pin 4 into the insulator 6 and fastening the securing member 41 to the guide pin 4 with the second horn plate 21 in between. Note that the coil spring 7 is inserted between the insulator 6 and the second horn plate 21. According to the present embodiment described above, by achieving simplification and labor saving of the mounting work of the insulators 6, simplification and labor saving of the mounting work of the dynamic damper can be achieved.

The present invention is not limited to the embodiment described above and it goes without saying that various changes may be made without departing from the scope of the present invention, such as interchanging the arrangement of the first horn plate 11 and the second horn plate 21.

The invention claimed is:

1. A steering wheel, comprising:
    a body portion that is mounted on a steering shaft that converts a rotating operation into a steering operation;
    a pad portion that is disposed in substantially a middle of the body portion;
    a horn switch that is configured by mounting the pad portion on the body portion so as to be movable in the axial direction of the steering shaft, the horn switch being configured between a fixed contact that is disposed on a body portion side and a movable contact that is disposed on a pad portion side;
    a first horn plate that is fixed to the body portion;
    a second horn plate that is fixed to the pad portion;
    a guide pin that is inserted through an opening portion of the first horn plate and that is erected with respect to the second horn plate;
    a flange-shaped stopper that is formed in the guide pin;
    an insulator that is locked to the opening portion of the first horn plate and that is disposed so as to be slidable along the guide pin; and
    a coil spring that is disposed between the second horn plate and the insulator and that biases the insulator towards the stopper, wherein
    the opening portion includes
        a plurality of extended portions that are each a portion of the opening portion with an enlarged diameter, and
        a notch formed in an edge portion, and
    the insulator includes
        a support that has a larger diameter than a diameter of the opening portion,
        a trunk portion that has a smaller diameter than the diameter of the support and that can be inserted through the opening portion,
        a plurality of lock portions having diameters that are partially enlarged from the trunk portion, the plurality of lock portions being capable of passing through the extended portions,
        a hook portion that is formed on a lateral side of the trunk portion and that can be engaged with the notch, and
        engagement holes that are formed in a surface that is in contact with the stopper, the engagement holes engaging thereto a jig for fixing the insulator to the opening portions.

2. The steering wheel according to claim 1, wherein
    in the opening portion, among the plurality of extended portions, an extended portion at least at one portion has a size or a shape that is different from those of the other extended portions.

3. The steering wheel according to claim 2, wherein
    the notch is formed at a single portion of the edge portion of the opening portion.

4. The steering wheel according to claim 1, wherein the insulator includes
- a first insulator that includes a first flange portion that forms a surface in contact with the stopper and a first leg portion that is disposed along the guide pin,
- a second insulator that includes a second flange portion that forms a surface in contact with the coil spring and a second leg portion that is disposed along the guide pin,
- a protector that is disposed between the first flange portion and the second flange portion and that includes the support and the trunk portion, and
- an elastic body that is disposed between the protector and the first insulator and between the protector and the second insulator.

5. The steering wheel according to claim 4, wherein the engagement holes include first engagement holes that penetrate the first flange portion, second engagement holes that penetrate a portion of the elastic body, and third engagement holes that do not penetrate through the support.

* * * * *